United States Patent
Baessler

(10) Patent No.: US 9,488,509 B2
(45) Date of Patent: Nov. 8, 2016

(54) METHOD OR DETERMINING AN ABSOLUTE FLOW RATE OF A VOLUME OR MASS FLOW

(71) Applicant: SYSTEC CONTROLS MESS- UND REGELTECHNIK GMBH, Puchheim (DE)

(72) Inventor: Stefan Baessler, Peterhausen (DE)

(73) Assignee: Systec Controls Mess-und Regeltechnik GmbH, Puchheim (DE)

( * ) Notice: Subject to any disclaimer, the term of this patent is extended or adjusted under 35 U.S.C. 154(b) by 747 days.

(21) Appl. No.: 13/650,826

(22) Filed: Oct. 12, 2012

(65) Prior Publication Data

US 2013/0096850 A1    Apr. 18, 2013

(51) Int. Cl.
| G01F 1/38 | (2006.01) |
| G01F 25/00 | (2006.01) |
| G01F 1/50 | (2006.01) |
| G01F 1/66 | (2006.01) |
| G01F 15/02 | (2006.01) |

(52) U.S. Cl.
CPC .............. *G01F 1/383* (2013.01); *G01F 1/50* (2013.01); *G01F 1/666* (2013.01); *G01F 15/028* (2013.01); *G01F 25/0007* (2013.01)

(58) Field of Classification Search
CPC ............ G01F 1/34; G01F 1/38; G01F 1/383; G01F 1/50; G01F 1/66; G01F 1/666; G01F 1/68; G01F 15/02; G01F 15/028; G01F 25/00; G01F 25/0007
See application file for complete search history.

(56) References Cited

U.S. PATENT DOCUMENTS

| 3,908,761 A | 9/1975 | Patterson et al. |
| 4,596,133 A * | 6/1986 | Smalling et al. ............ 73/24.01 |
| 4,787,252 A | 11/1988 | Jacobson et al. |
| 5,373,026 A | 12/1994 | Bartz et al. |
| 5,741,980 A | 4/1998 | Hill et al. |
| 5,864,183 A * | 1/1999 | Fisher et al. .................... 290/43 |
| 6,412,352 B1 | 7/2002 | Evans et al. |
| 6,412,353 B1 | 7/2002 | Evens et al. |

(Continued)

FOREIGN PATENT DOCUMENTS

| DE | 3523888 A1 | 1/1987 |
| DE | 102009001525 A1 | 9/2010 |
| JP | H08271307 A | 10/1996 |

OTHER PUBLICATIONS

ISO 5167-1—International Standard "Measurement of fluid flow by means of pressure differential devices inserted in circular cross-section conduits running full—Part 1: General principles and requirements", Second Edition Mar. 1, 2003.

(Continued)

*Primary Examiner* — Toan Le
(74) *Attorney, Agent, or Firm* — Laurence A. Greenberg; Werner H. Stemer; Ralph E. Locher

(57) ABSTRACT

A method for determining an absolute flow rate of a volume or mass flow includes measuring continuous reference values, where each individual reference value is in a direct physical relationship to the flow rate, determining reference value fluctuations, and calculating or mapping the absolute flow rate as a function of a numerical and/or statistic evaluation function of the reference value fluctuations, in particular a fluctuation value generated therefrom. A measurement configuration for implementing the method is also provided.

20 Claims, 5 Drawing Sheets

(56) References Cited

U.S. PATENT DOCUMENTS

| | | |
|---|---|---|
| 8,844,371 B2 | 9/2014 | Limacher et al. |
| 2003/0208326 A1 | 11/2003 | Chen et al. |
| 2004/0261539 A1 | 12/2004 | Umekage et al. |
| 2013/0006130 A1* | 1/2013 | Olde .................. A61B 5/026 600/504 |

OTHER PUBLICATIONS

ISO 5167-2—International Standard "Measurement of fluid flow by means of pressure differential devices inserted in circular cross-section conduits running full—Part 2: Orifice plates", First Edition Mar. 1, 2003.

EN ISO 5167-3—European Standard Measurement of fluid flow by means of pressure differential devices inserted in circular cross-section conduits running full—Part 3: Nozzles and Venturi Nozzles, Mar. 2003.

ISO 5167-4—International Standard "Measurement of fluid flow by means of pressure differential devices inserted in circular cross-section conduits running full—Part 4: Venturi tubes", First Edition Mar. 1, 2003.

\* cited by examiner

METHOD OR DETERMINING AN ABSOLUTE FLOW RATE OF A VOLUME OR MASS FLOW

BACKGROUND OF THE INVENTION

Field of the Invention

The invention relates to a method for determining an absolute flow rate of a volume or mass flow.

A method for determining a flow rate is known from DIN EN ISO 5167: "The measurement principle is based on the insertion of the throttle device (e.g. orifice plate, a nozzle or a Venturi tube) in a conduit running full. The insertion of the throttle device produces a difference in the static pressures between the plus pressure withdrawal in the inlet and minus pressure withdrawal in the narrowest throttle cross-section or in the outlet. The flow can be determined from this measured differential pressure, from the material values of the fluid and from the geometrical data (in each case under operating conditions). Here it is assumed that this throttle device is geometrically similar to a device calibrated under the same operating conditions (see ISO 5167-2, ISO 5167-3 or ISO-5167-4)." FIG. 1 shows as an example a throttle device with the location of the differential pressure withdrawal upstream of the throttle element 4' and in the throttle constriction 4". The differential pressure can be obtained by forming the difference of two absolute pressure sensors or by direct measurement using a differential pressure sensor.

The flow rate is typically quadratically dependent on the differential pressure, as shown schematically in FIG. 2. The accuracy of the determination of the flow or the flow rate therefore depends crucially on the accuracy of the differential pressure measurement. FIG. 3 illustrates the influence of a measurement error (offset) in the differential pressure measurement on the determination of the flow rate.

Several sources of error in the differential pressure measurement are known from practice. Measurement deviations are caused by the effect of temperature (temperature drift, mechanical stresses between measurement element, housing and adhesive), own weight (position of the sensor element) weight effect of media on sensor element (e.g. condensate) or non-linearities of the sensor characteristic. Furthermore, the measurement signal can be modified by electrochemical changes at the measurement element, for example, an electrolytically modified gel protective layer.

As a result of the said effects, the measurement accuracy of the mass flow or flow rate measurements in the differential pressure method is overall limited.

An improvement in the measurement accuracy of the differential pressure sensor technology is advantageous in order to be able to expand the applicability of this technique in the range of small and extremely small flows with good measurement accuracy. In particular, when differential pressure methods are applied in the area of air mass measurement in internal combustion engines and other applications in which a higher remaining pressure loss is disadvantageous, the need arises to limit the design of the throttle elements to small differential pressures. The smallest differential pressures to be measured (e.g. when the engine is idling) therefore extend into the range of typical uncertainty of the differential pressure sensor (offset drift), which can lead to large measurement errors.

Improvements achieved in the area of differential pressure sensor technology are, for example, mutually interconnected measurement elements to compensate for positional and temperature influences, reduction of thermal stresses by suitable choice of materials and protection of measurement elements by means of metal membranes and oil fillings. These approaches have in common the improvement of the differential pressure sensor itself for measurement or static or quasi-static differential pressures.

A known method in this respect is the vortex/eddy counting method. To this end a damming body is inserted in a pipe piece which brings about vortex formation in the flow (Kármán vortex street). As a result, periodic vortices become detached. The detachment frequency of the vortices is a measure for the inflow velocity. In some designs a differential pressure sensor is used as signal transducer. The vortex detachment frequency can be determined by means of the frequency of the discrete pressure pulses in the differential pressure signal. In particular the pressure troughs and the pressure peaks or the zero crossings from positive and negative pressures are detected and counted, substantially without regard to the contribution of the particular pressure values. The vortices can therefore be detected by means of a differential pressure measurement; but the precise contributions of the differential pressures themselves are not related to the flow rate or are not used for its determination.

BRIEF SUMMARY OF THE INVENTION

It is the object of the present invention to provide an improved method for determining an absolute flow rate of a volume or mass flow.

The object forming the basis of the invention is solved by a method for determining an absolute, in particular absolute mean, flow rate of a volume or mass flow, comprising the following process steps: measuring continuous reference values, where a reference value is in each case in a direct physical relationship to the flow rate, e.g. a linear, quadratic or generally polynomial relationship; a reference value fluctuation is determined from the reference values as the result of a mathematical function e.g. a standard deviation, variance or similar or as the result of a signal analysis, e.g. amplitude, frequency, period time; the absolute flow rate is then determined on the basis of the reference value fluctuation. This can be accomplished with the aid of a formula-like relationship or a characteristic or table of values.

Characteristics of a turbulent flow are fluctuations of the flow rate about the mean flow rate. The ratio of flow rate and mean flow rate is designated in flow technology as degree of turbulence TU. It fundamentally holds that: the higher the mean flow rate, the higher is the fluctuation width. From the time profile of the velocity fluctuation in a flowing fluid, at a mean velocity of, for example, 10 m/s and an assumed sinusoidal velocity fluctuation, the flow can be characterized by statistical quantities such as amplitude, standard deviation, mean and frequency. The degree of turbulence can then be determined from the standard deviation and mean flow rate. As a result of the flow-technology relationship (Bernoulli's law) of differential pressure and flow rate, a similar behavior can be observed at the differential pressure sensor. With increasing flow rate, the fluctuation range in the differential pressure signal also increases. Even below the turbulent flow range, fluctuation values can be observed which are higher than the ambient noise of the sensor so that the range of application can be extended downwards.

The idea of the present invention is therefore in particular to determine the mean flow rate as a function of the fluctuation range. In principle, however, the procedure for differential pressure methods is also suitable for other methods in which the fluctuation of the measured quantity is in a causal relationship with the flow rate or mass or volume flow. Other methods in this sense are, for example, the transit time method in ultrasound measurement technology, thermo-anemometer methods (e.g. hot film sensor, constant temperature anemometer). The inflow velocity can also be determined from the fluctuations of the vortex frequencies in the vortex method. As a result of the large number of different physical measured quantities possible in each case such as differential pressure, current intensity, temperature, time, frequency or a velocity value output by the sensor and possibly falsified etc., these are combined hereinafter under the term reference value. The fluctuation of the reference value is designated as reference value fluctuation.

In the classical determination of the flow rate, e.g. by means of a differential pressure measurement, in particular a temperature drift of a pressure sensor could lead to a falsified absolute flow rate value. The fluctuations of the reference values on the other hand do not usually vary with the drift of the sensor element or other influential quantities. In this respect, in particular the mean reference value can be calculated from the reference values. It is advantageous here in particular that the influence of an offset drift, e.g. caused by a temperature influence, computationally has no more influence on the level of the reference value fluctuation. The absolute flow rate can then be obtained, for example, by means of a correlation of statistical or numerical quantities on the basis of the reference value fluctuation with the flow rate. By using this method, the offset, for example, of a differential pressure sensor can thus be determined and corrected. It can furthermore be determined by reference to the level of the reference value fluctuation whether a flow rate >0 exists or whether this comprises fluctuations within the framework of the ambient noise of the sensor in quiescent flow. In the latter case, an offset alignment can be performed by determining the reference mean as a new sensor base value of the sensor characteristic (with reference value=0).

In particular the variance or the standard deviation of the fluctuations, the amplitude or the frequency of the reference value fluctuations are suitable for evaluating the reference value fluctuations. The influencing variable can be incorporated by means of characteristic diagrams or characteristics which, for example, were determined experimentally.

Preferably however, the absolute flow rate can be calculated additionally as a function of the mean reference value.

Preferably the calculation parameters used to calculate the absolute flow rate as a function of the reference value fluctuations comprise those values which take into account or in particular map the degree of turbulence of the flow. The degree of turbulence can be substantially independent of the current flow rate and largely constant within a measurement arrangement.

A defined limit value is preferably specified. In the event that reference values lie below this defined limit value, the absolute flow rate is determined according to the aforesaid method. In the event that reference values lie above this defined limit value, the absolute flow rate is determined by means of the reference values without evaluating the reference value fluctuations. The defined limit value can be selected so that above the limit value calculations of the flow rate based only on the dynamic pressure difference are substantially not susceptible to error. Below this defined limit value on the other hand, the calculation is made on the basis of the reference value fluctuations so that the error sources already discussed remain without influence in the result when determining the absolute flow rate.

Preferably a calibration is made which in particular takes place automatically. In this case, in particular a reference value is measured at a high flow rate, in particular in the presence of a reference value above a defined limit value. The reference value is then set equal to the absolute flow rate. Calculation parameters are then adapted. The calculation parameters can in particular comprise values which also comprise or map the degree of turbulence. Use is made of the fact that at high flow rates the accuracy of the flow rate determination based on the dynamic pressure difference measurement can already be very exact even disregarding the fluctuations. The values thus obtained for the calibration can then also be used for the lower velocity ranges. A manual calibration of the measurement arrangement can thus be omitted. After running through the calibration, the measuring device can be ready for operation without complex calibration, e.g. by hand, being required.

The invention further relates to a measurement arrangement which executes a method for determining an absolute flow rate according to one of the preceding claims. The measurement arrangement can comprise a conduit and a differential pressure measuring device. A data processing unit can further be provided which can also be part of the differential pressure device. A throttle point is provided in the conduit so that the flow rate is locally increased at this point, which results in a reduction in the dynamic pressure there. The mass flow in the conduit is identical in the region of the two pressure sensors. The measurement arrangement can, however, also comprise a dynamic pressure probe, ultrasound measuring device or a thermal anemometer which delivers the velocity reference values. Then a constriction or throttle point is not necessarily required.

BRIEF DESCRIPTION OF THE SEVERAL VIEWS OF THE DRAWING

The invention is explained in detail hereinafter with reference to the figures. In the figures.

DESCRIPTION OF THE INVENTION

Figure 1:
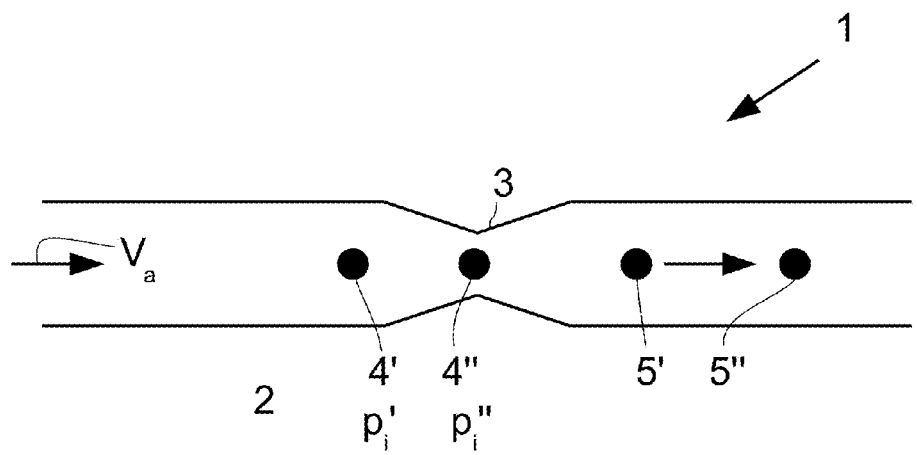
FIG. 1 shows an exemplary measurement arrangement for the method according to the invention.
Figure 2:
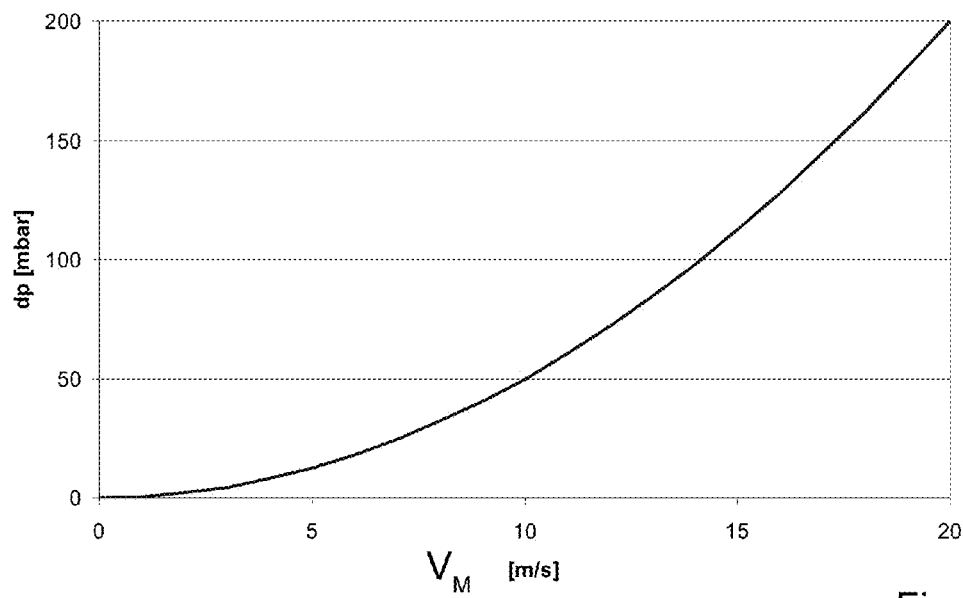
FIG. 2 shows as an example the relationship between mean inflow velocity and generated dynamic pressure.
Figure 3:
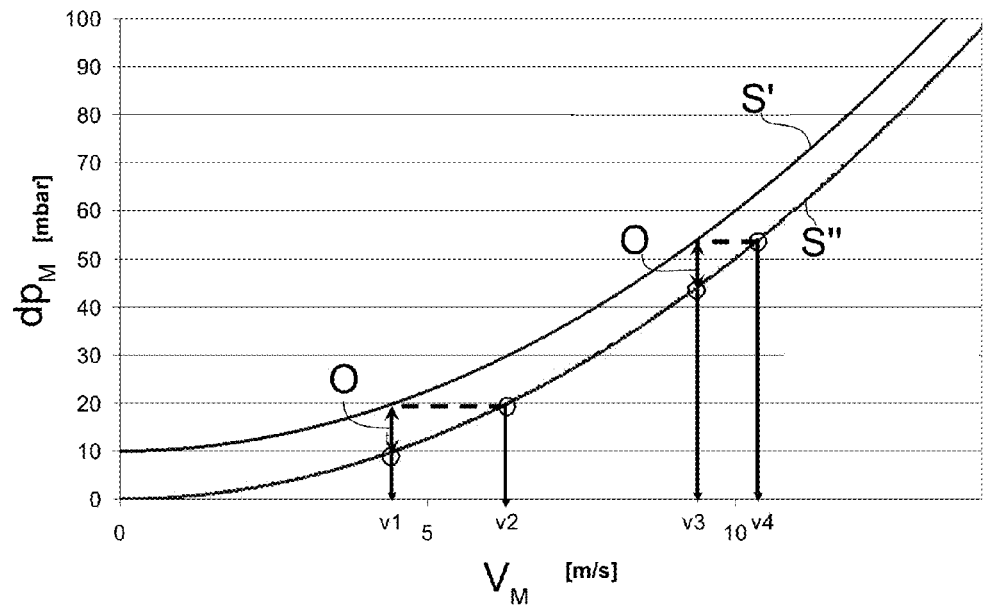
FIG. 3 shows as an example the incorrect determination of the inflow velocity in the presence of an offset.

The structure of a possible measurement arrangement and the basic knowledge has already been discussed initially with reference to FIGS. 1 to 3.

FIG. 1 shows a measuring tube 1. This measuring tube 1 has a tube section 2 which is followed by a constricted section 3 in the direction of flow. A fluid, liquid or gaseous, flows initially through the tube section 2 and then enters into the constricted region 3. A first pressure sensor 4' that can record a first dynamic pressure $p_i'$ is located in the tube section 2. A second pressure sensor 4" which can record a second dynamic pressure $p_i"$ is located in the constricted region 3. In the constricted region 3 the fluid has an increased velocity with the result that the second dynamic pressure $p_i"$ determined there is lower than the first dynamic pressure $p_i'$ in the region of the tube section 2. The structure shown here in principle represents the structure of an orifice plate which is provided in DIN EN ISO 5167. Additionally or alternatively to the measurement points, further measurement points 5', 5" are provided which are not related to the constricted region.

FIG. 2 shows the relationship between mean inflow velocity $v_M$ and generated differential pressure dp for example for a fluid having the density 1 kg/m$^3$ and the differential pressure dp=0.5×density×v$^2$.

FIG. 3 shows the incorrect determination of the inflow velocity in the presence of an offset (drift) of the differential pressure sensor (differential pressure sensor). As an example this is shown for offset O=10 mbar; the real inflow velocity $v_2$ results in a differential pressure $dp_M$=10 mbar; the differential pressure measured by the sensor with offset is 20 mbar, which leads to an incorrect determination of the inflow velocity ($v_1$ is incorrectly determined instead of $v_2$ as real velocity). The error is greatest for $v_M$=0 m/s and becomes continuously smaller with increasing flow rate ($v_4/v_3<v_1/v_2$).

Figure 4:
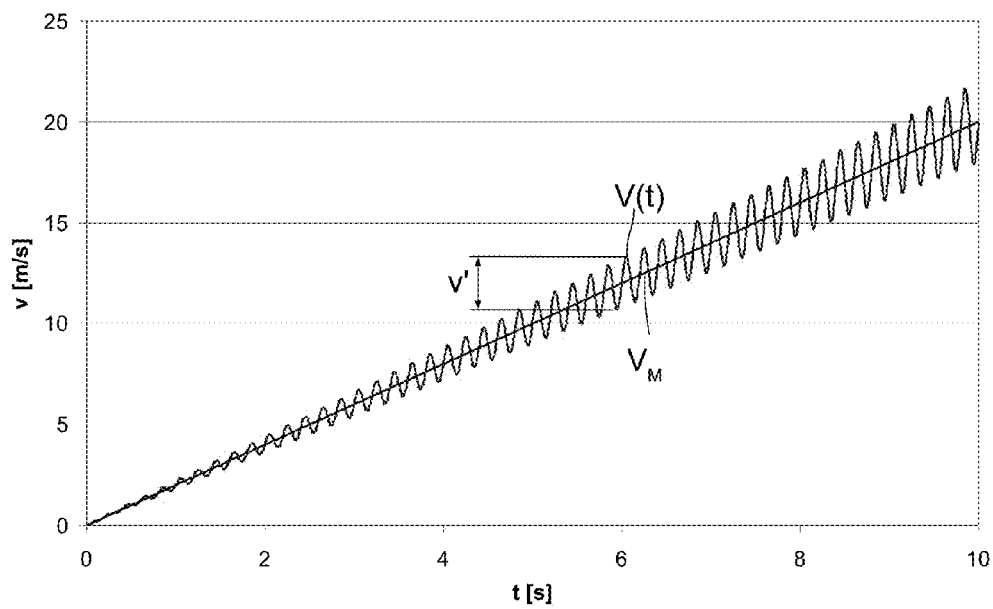
FIG. 4 shows as an example the time behavior of the absolute and mean inflow velocity.

FIG. 4 shows the time behavior of the inflow velocity v(t) during acceleration of the fluid. $v_M$ is the mean of the inflow velocity; the fluctuation range increases with increasing mean inflow velocity; in order to illustrate the effect, the fluctuation is assumed highly simplified to be a sinusoidal superposition and a linear increase in the mean flow rate from 0 to 20 m/s is assumed.

Figure 5:
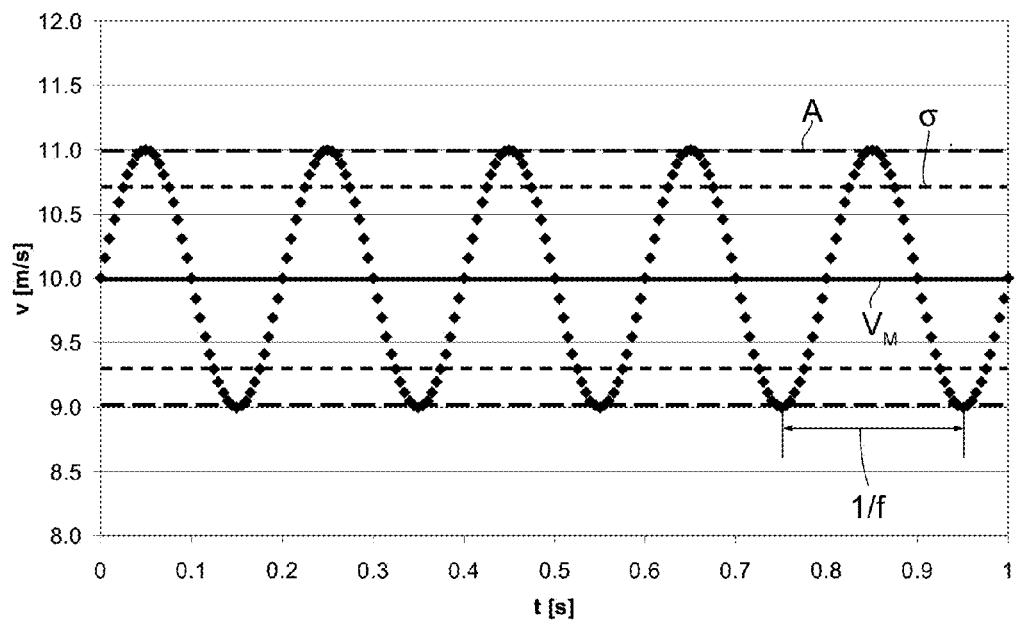
FIG. 5 shows as an example an extract from the time behavior of the velocity with substantially constant mean velocity.

Characteristics of a turbulent flow are fluctuations v' of the flow rate around the mean flow rate $v_M$. The ratio $v'/v_M$ in flow technology is designated as degree of turbulence. FIG. 4 is intended to illustrate the change in the fluctuation range with an assumed degree of turbulence of 10%. It fundamentally holds that: the higher the mean flow rate, the higher is the fluctuation range. FIG. 5 shows an exemplary cross-section of the time behavior of the velocity fluctuation in a flowing fluid with a mean velocity of 10 m/s and an assumed sinusoidal velocity fluctuation, which can be characterized by statistical quantities such as amplitude, standard deviation σ, mean $v_M$, $dp_M$ and frequency f. The degree of turbulence can be determined, for example, from the standard deviation a and the mean flow rate $v_M$.

The variance or the standard deviation σ of the fluctuations (see FIGS. 5 and 7), the amplitude A or the frequency f of the reference value fluctuations are particularly suitable for evaluating the reference value fluctuations. The influencing variables can be incorporated by means of characteristic diagrams which, for example have been determined experimentally.

Figure 6:
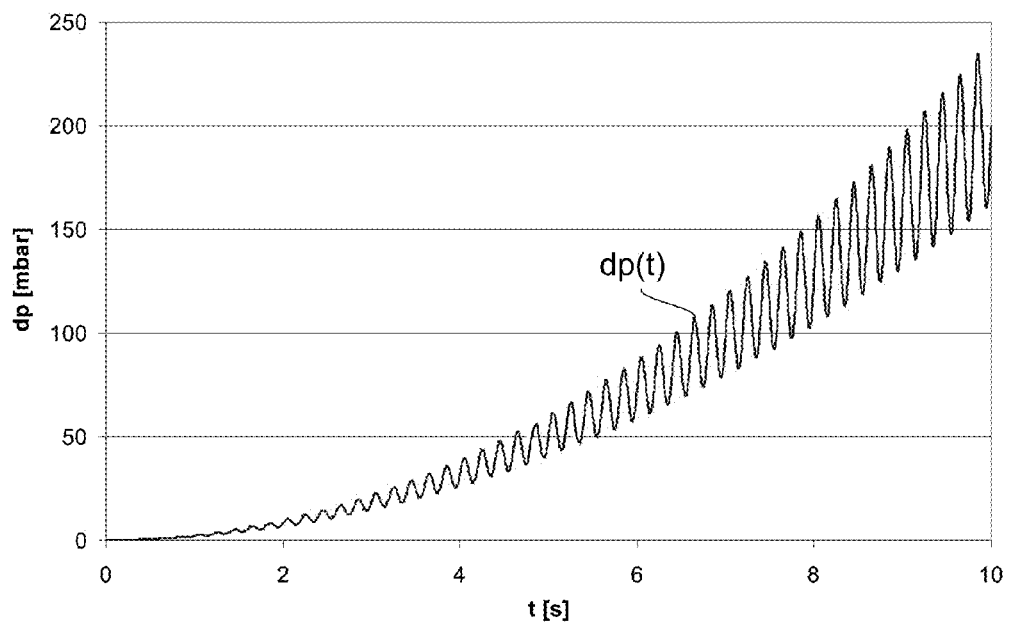
FIG. 6 shows as an example the time behavior of the differential pressure.
Figure 7:
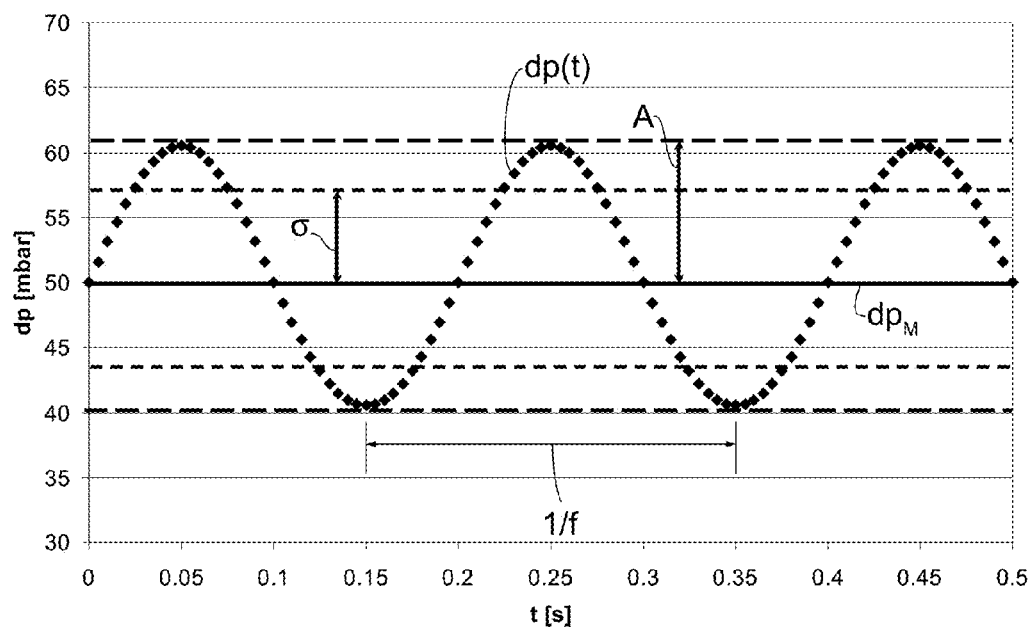
FIG. 7 shows as an example the extract from a differential pressure time behavior.

As a result of the fluidic relationship (Bernoulli's law) of differential pressure and flow rate, a similar behavior can be observed at the differential pressure sensor, as can be identified in FIGS. 6 and 7. With increasing flow rate the fluctuation range in the differential pressure signal also increases. Fluctuation values can be observed below the turbulent flow range which are higher than the ambient noise of the sensor and thus the range of application can be extended downwards.

Figure 8:
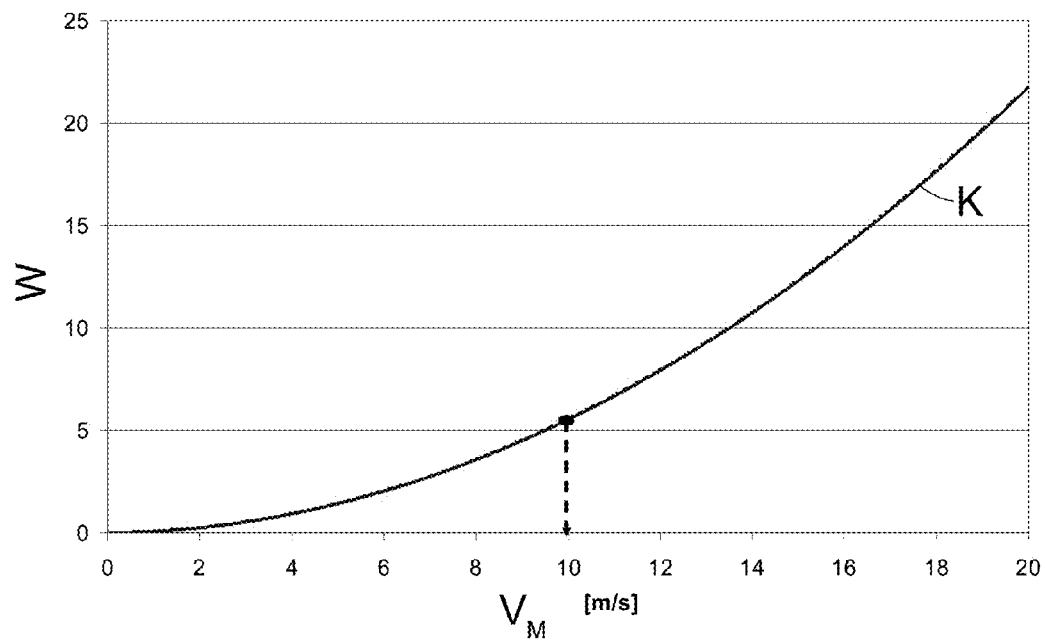
FIG. 8 shows as an example the correlation between fluctuation value and inflow velocity.

The absolute flow rate can then be obtained, for example, by means of a correlation of statistical or numerical quantities on the basis of the reference value fluctuation with the flow rate. FIG. 8 shows the correlation of fluctuation value and mean inflow velocity; the fluctuation value here for example is for the standard deviation determined from a series of dp(t) measured values. A correlation of statistical or numerical quantities W (for example, the standard deviation σ, the variance etc.) on the basis of reference value fluctuations with the flow rate is illustrated as an example for a differential pressure signal.

Figure 9:
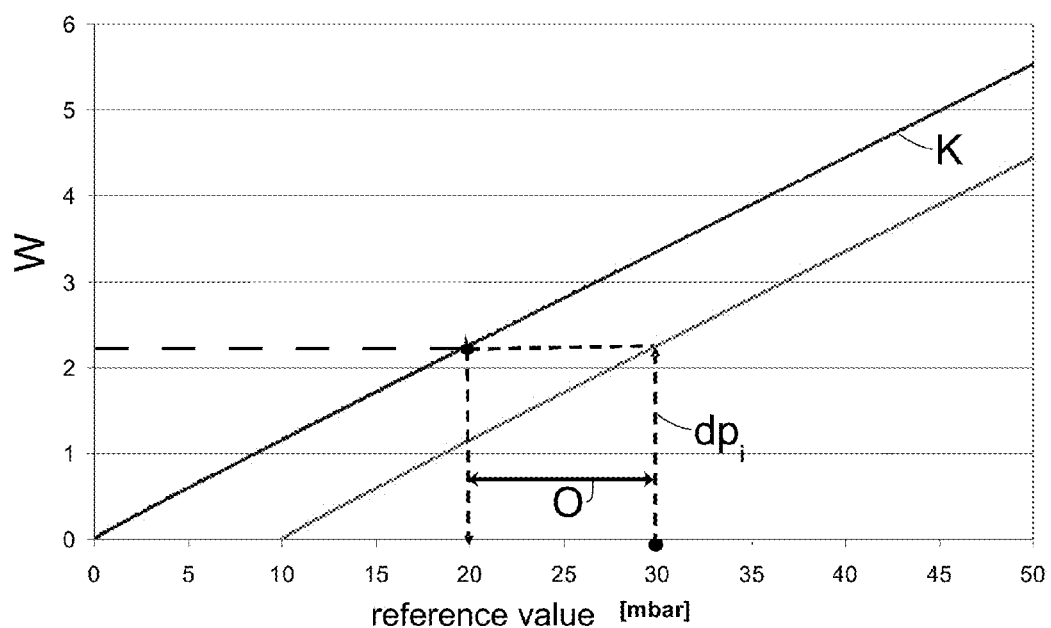
FIG. 9 shows as an example the determination of the reference value by means of a characteristic.

By using this method the offset, for example, of a differential pressure sensor can thus be determined and corrected. FIG. 9 shows how a reference value assigned by means of a characteristic is determined by means of a reference value fluctuation and set in comparison to the measured (mean) reference value. The difference is then the offset. After determining the reference value fluctuation, as shown in FIG. 9, the associated reference value (here differential pressure dp) can be determined by means of a characteristic. If the dp sensor has a drift, this can be determined from the difference of measured value (here 30 mbar) and dpa value determined from the characteristic (here 20 mbar) (here: offset=30 mbar−20 mbar=10 mbar).

REFERENCE LIST $p_i$ Static pressure
$dp_i$ Differential pressure at measurement element (throttle element)
$f_i$ Frequency
$I_i$ Current intensity of a thermal anemometer
Pi Power, heating power
$t_i$ Period duration/transit time in ultrasound measuring device
$U_i$ Voltage
$V_i$ Velocity
$V_A$ Absolute flow rate
V' Velocity fluctuation
A Amplitude
O Offset
S' Signal with offset error
S" Signal without offset error
σ Standard deviation
K Characteristic
W Fluctuation value
1 Measuring tube
2 Tube section
3 Constricted section
4', 4", 5', 5" Sampling points for differential pressure, absolute pressure or reference value
Indices
i Measured value
M Mean
' Fluctuation value

The invention claimed is:

1. A method for determining an absolute flow rate of a volume or mass flow, the method comprising the following steps:
   measuring continuous reference values of the volume or flow with a sensor, with each individual reference value being in a direct physical relationship to the flow rate;
   determining, with a data processing unit, reference value fluctuations from the measured continuous reference values; and
   with the data processing unit, calculating or mapping the absolute flow rate of the volume or flow as a function of at least one of a numerical or statistic evaluation function of the reference value fluctuations.

2. The method according to claim 1, wherein the evaluation function is a fluctuation value generated from the reference value fluctuations.

3. The method according to claim 2, which further comprises selecting the fluctuation value from the group consisting of amplitude, standard deviation and variance of the reference value fluctuations.

4. The method according to claim 1, which further comprises using velocity values as reference values and forming the reference value fluctuations from fluctuations of the velocity values.

5. The method according to claim 1, which further comprises using dynamic pressure difference values of a dynamic pressure meter as reference values and forming the reference value fluctuations from fluctuations of the dynamic pressure difference values.

6. The method according to claim 1, which further comprises using initial values of a thermal anemometer as reference values and forming the reference value fluctuations from fluctuations of the initial values.

7. The method according to claim 1, which further comprises using transit time values, velocity values or frequency values of an ultrasound signal as reference values and forming the reference value fluctuations from fluctuations of the reference values.

8. The method according to claim 1, which further comprises determining the absolute flow rate as a function of a variance of the reference value fluctuations.

9. The method according to claim 1, which further comprises determining the absolute flow rate as a function of a standard deviation of the reference value fluctuations.

10. The method according to claim 1, which further comprises determining an amplitude of the fluctuations of the reference values and calculating the absolute flow rate as a function of the amplitude of the reference value fluctuations.

11. The method according to claim 1, which further comprises determining the absolute flow rate as a function of a frequency of the reference value fluctuations.

12. The method according to claim 1, which further comprises calculating the absolute flow rate as a function of a mean reference value.

13. The method according to claim 1, which further comprises setting calculation parameters for determining the absolute flow rate including a degree of turbulence of the flow.

14. A method for determining an absolute flow rate of a volume flow, the method comprising the following steps:
determining the absolute flow rate by a method according to claim 1 if reference values lie below a defined limit value; and
determining the absolute flow rate without a numerical or statistical evaluation of the reference value fluctuations if reference values lie above the defined limit value.

15. The method according to claim 14, which further comprises performing a calibration before the continuous measuring step by determining reference value fluctuations at a high flow rate, assigning the reference value fluctuations to an absolute flow rate and then adapting calculation parameters.

16. The method according to claim 15, which further comprises carrying out the step of determining the reference value fluctuations at a high flow rate in the presence of a reference value above a defined limit value.

17. The method according to claim 14, which further comprises checking the existence of a flow by a comparison of the reference value fluctuation with a limit value and, in the event that such a flow exists, correcting a resulting offset drift by renewed measurement detection of a sensor value of an actual offset.

18. The method according to claim 1, wherein:
the reference value fluctuations define fluctuation ranges in which the measured continuous reference values fluctuate; and
in the calculating or mapping step, the fluctuation ranges are applied to the numerical or statistic evaluation function in order to calculate or map the absolute flow rate of the volume or flow.

19. A measurement configuration for determining an absolute flow rate of a volume or mass flow, comprising:
a sensor configured for measuring continuous reference values of the volume or flow, with each individual reference value being in a direct physical relationship to the flow rate; and
a data processing unit configured for determining reference value fluctuations from the measured continuous reference values, said data processing unit also configured for calculating or mapping the absolute flow rate of the volume or flow as a function of at least one of a numerical or statistic evaluation function of the reference value fluctuations.

20. The measurement configuration according to claim 19, wherein:
the reference value fluctuations define fluctuation ranges in which the measured continuous reference values fluctuate; and
said data processing unit is configured to apply the fluctuation ranges to the numerical or statistic evaluation function in order to calculate or map the absolute flow rate of the volume or flow.

* * * * *